United States Patent Office 3,539,878
Patented Nov. 10, 1970

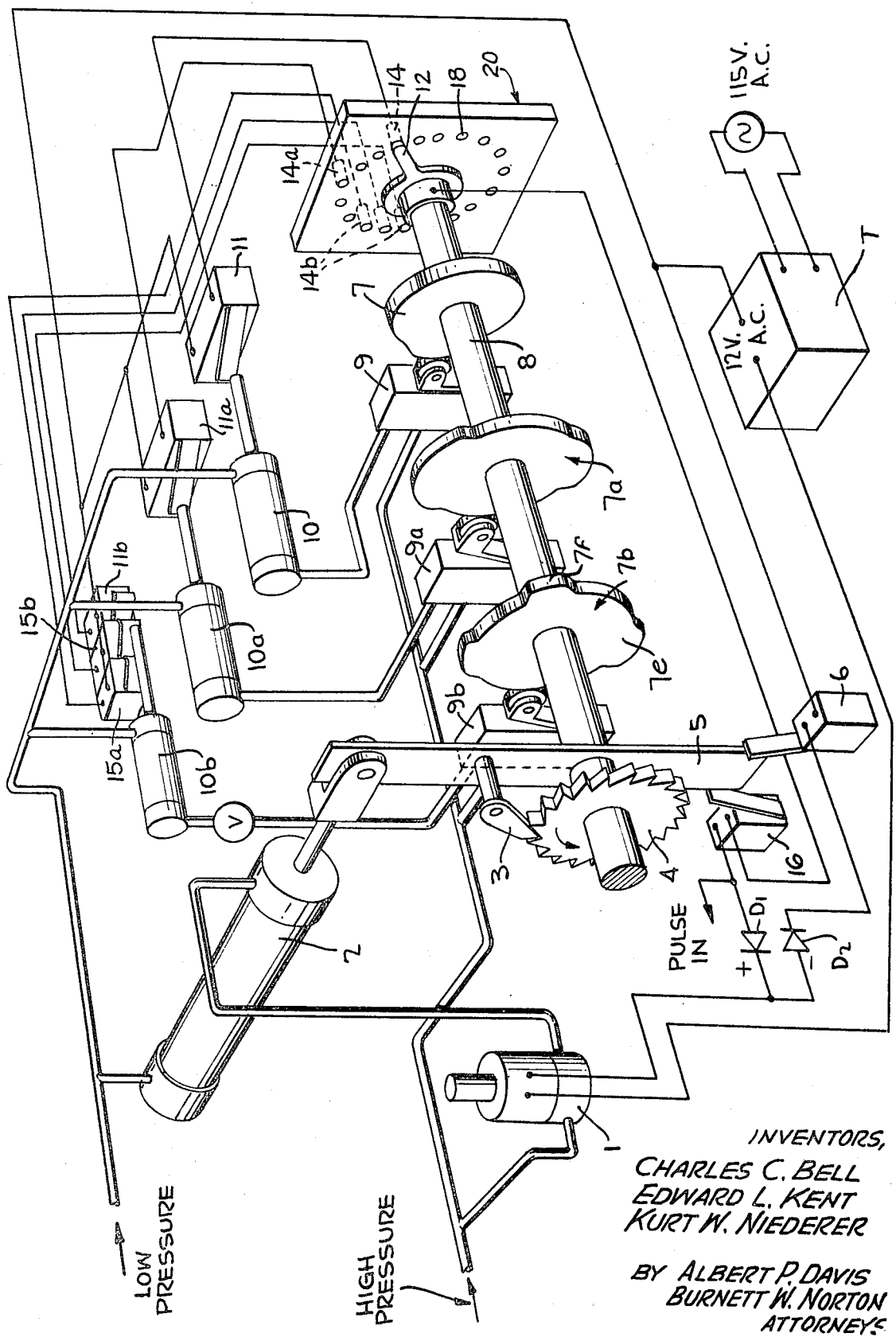

3,539,878
APPARATUS FOR CONTROLLING A SERIES OF SEQUENTIAL OPERATIONS
Charles C. Bell and Edward L. Kent, Warwick, and Kurt W. Niederer, Saunderstown, R.I., assignors to Leesona Corporation, Warwick, R.I., a corporation of Massachusetts
Filed Mar. 3, 1967, Ser. No. 620,454
Int. Cl. H01h 47/00
U.S. Cl. 317—157　　　　　　　　　　　　　　　6 Claims

ABSTRACT OF THE DISCLOSURE

A sequencing pulse programmer applicable to automating various operations such as metal working and textile machinery is described. The programmer comprises an activating means, an indexing cylinder, a work shaft, a shaft indexing means, work cylinders and a rotary contact switch. The various elements of the programmer are constructed and arranged to initiate a work operation and at the end of the work operation feed back a pulse to initiate an additional operation. Numerous sequential operations can be programmed into the device including time delays between operations.

FIELD OF INVENTION

The present invention is directed to automation and more particularly to a pulse programmer adapted to command a series of actions according to a predetermined and modifiable sequence. The sequencing pulse programmer has application in numerous operations such as controlling the steps in a metal working operation, textile equipment, and the like.

BACKGROUND AND PRIOR ART

Programmers for squentially controlling various steps in the work cycle of a metal working machine such as boring, drilling, surfacing, milling, tapping, and the like, or in a textile operation such as donning and doffing a bobbin, threading a machine for subsequent operation, and the like, are known. These devices, however, even for a relatively simple operation are complex, requiring synchronization of electrical and hydraulic, or the like, means. The installation and maintenance of such programmers are expensive, precluding their use in many operations which otherwise are compatible with automation.

OBJECTS AND BRIEF DESCRIPTION OF INVENTION

Accordingly, it is an object of the present invention to provide a simplified sequential programmer.

It is another object of the invention to provide a simplified sequential programmer which can program time delays between steps.

It is another object of this invention to provide a simplified programmer which can automatically control as few as two and as many as thirty or more sequential operations including time delays.

It is still another object of this invention to provide a sequential programmer which initiates a work operation by means of an electrical pulse, and at the end of the work operation, feeds back a signal, initiating a second work operation.

It is still another object of this invention to provide a pulse programmer which is simple in construction and operation comprising electrical activating means, an indexing cylinder, a work shaft, shaft indexing means and a rotary contact switch, said elements being constructed and arranged to initiate a work operation, and at the end of the work operation feed back a pulse to initiate a further operation.

These and other objects of the invention will become more fully apparent from the following detailed description with particular reference to the illustrative drawing.

The aforesaid objects of the present invention are obtained by constructing a programmer wherein an electrical pulse is received by a diode activating an electrical actuator which sets an indexing cylinder in motion. The indexing cylinder moves a shaft by means of a shaft indexer. At the end of its movement, the shaft indexer actuates a switch which reverses the operation of the electrical actuator, resetting the indexing cylinder and shaft indexer for the next operation. Cam means on the work shaft set a means in motion for actuating a work cylinder which performs the first operation in the sequentially programmed series. At the end of its work stroke, and at the completion of the operation, the work cylinder feeds a signal through a rotary contact switch common to the shaft, to the diode which actuates a second operation. The sequence is repeated as many times as desired utilizing different cam positions, work cylinders, and the like, and passing the signal through a different set of contact points on the rotary switch. Time delays in the sequential operations can be obtained by going through an operation one or more times without having the cycle programmed to a positive work step. Moreover, by throttling the work cylinder the work operation can be slowed down.

The improved programmer constructed in accordance with the present invention and its operation will be more readily apparent by reference to the drawing which sets forth a schematic arrangement of a preferred embodiment of the pulse programmer.

More specifically, referring to the drawing, an electrical pulse is supplied as by a connection, not shown, with transformer T to diode $D_1$ which operates a solenoid valve 1. Solenoid valve 1 preferably is a valve comprising a release and latch position. An exemplary valve is marketed by Skinner Electrical Valves, New Britain, Conn., under the trade name "Magnelatch." Unlike a conventional solenoid valve, a continuous flow of current through a coil is not required to hold a plunger in one position. The valve operates by means of a permanent magnet latch circuit which can be controlled by a momentary current pulse of 20 milliseconds or a continuous current flow. When in the latch position, there is no heat rise and no power consumption. Very low current is required due to the small current pulse used to latch and unlatch the valve. In addition, the control circuit has a memory factor requiring a pulse of the opposite polarity to unlatch. Although the aforesaid valves are preferred, conventional solenoid valves in combination with a relay can be employed.

Solenoid valves upon being energized by the electrical pulse, allows high pressure to flow to indexing cylinder 2 moving pawl 3 and ratchet 4 one tooth. At the end of the stroke, ratchet lever 5 actuates switch 6 which sends an electrical pulse through diode $D_2$ to the coil of solenoid valve 1. The pulse, being of opposite polarity, reverses the operation of, or release the Magnelatch switch 1, relieving the high pressure in cylinder 2 permitting low pressure to operate cylinder 2 in the reverse direction, resetting pawl 3 for the next operation. Cam 7 is carried on shaft 8 for bodily rotation therewith with ratchet 4 and operates an air valve 9 passing high pressure to cylinder 10. Cylinder 10 performs the first operation of the programmed series. At the end of its work stroke, cylinder 10 actuates switch 11 closing its contacts. Switch 11 feeds a signal through a contact point 14 and a rotary contact 12 of a multi-contact rotary selector switch 30 to switch 16. Switch 16 is held closed by the ratchet lever 5 when in proper starting position and passes a pulse to diode $D_1$. This pulse activates valve 1 and the sequence is repeated through cam 7a, air valve 9a, cylinder 10a, switch 11a, contact 12a and then through cam 7b, etc.

As apparent, the number of operations in the programmed series can be varied by adding or removing cams or varying the number of positions on the cams, and increasing the valve means, work cylinders, and contact points. Moreover, it is possible to lengthen or slow down the work operation or time delay by employing a throttling valve on a work cylinder such as V. Furthermore, the same work cylinder can be used for more than one operation by having a plurality of position on the cam as can be seen in the case of cam 7b which is provided with two lobes 7e and 7f. In this embodiment, more than one switch means, for example switches 11b, 15a and 15b can be associated with a given work cylinder e.g. cylinder 10b with the various contact points of the switch, or switches, being in communication with different contact points 14a and 14b on the selector switch 20. A signal is fed back only when the particular cam position, switch and contact are in communication. Furthermore, the switches in contact with the various work cylinders can be connected in series, whereby a number of operations which are being carried out concurrently must be completed prior to feeding a signal back to the actuator to initiate a subsequent operation. Additionally, although the embodiment shown employs air pressure in the work cylinders and the valves in combination with the cams, the programmer can be constructed to utilize electrical actuated work cylinders. Additionally, the air valves can be replaced by electrical switches. Furthermore, the electrical actuators and switches can be eliminated completely and replaced with fluid flow valves which are actuated by a pulse of air. Various other modifications can be made by those skilled in the art and which fall within the framework of the present invention.

UTILITY

Although it has been indicated hereinbefore that the pulse sequencing programmer in accordance with this invention can be employed to control operations in metal working, textile equipment, and the like, the simplicity of the design renders it especially suitable for programming the operation of an automated spinning unit of the type shown in commonly assigned Bell and Niederer co-pending application Ser. No. 534,081 filed Mar. 14, 1966. The aforesaid device comprises a plurality of spinning positions of substantially conventional design. However, the unit is equipped with a patrolling tender which automatically services all of the spinning positions. In operation, the unit has a total of 30 individual operations including 5 time delays comprising stopping the patrolling tender at a spinning position which requires service, doffing a full bobbin, donning an empty bobbin, threading the bobbin and restarting the tender. Additionally, safety features are built into the unit whereby if one operation is not completed, i.e., in the event the successful starting of the bobbin is not affected, the unit will shut down, try again once, and if again not successful, actuate an alarm light and start the tender to continue its patrol. In the operation of the device, it is highly desirable, if not essential, that one operation be completed before the next operation is initiated. Accordingly, the present programmer which feeds back a signal at the end of the work operation to initiate a subsequent operation is highly desirable in programming the unit. Since the aforesaid device does not constitute any part of the present invention and since one skilled in the art having the aforesaid co-pending application and the present teaching as a guide could readily adapt the present programmer to the device, a detailed description will not be set forth herein.

It should be appreciated that the instant invention is not to be construed as being limited by the illustrative embodiments. It is possible to produce still other embodiments without departing from the inventive concept herein disclosed. Such embodiments are within the ability of one skilled in the art.

It is claimed:

1. A programmer for automatically controlling a series of sequential operations of a plurality of work means each having a controlled motion and adapted upon said motion to perform one of said operations, said programmer comprising, actuating means activable to initiate the operation of one of said work means at a time, and signal means energized as a work means reaches the end of said controlled motion to activate said actuating means to initiate the motion of the work means for performing the next operation, said sequence being repeated until all of said operations are completed.

2. The programmer of claim 1 further including cyclically operable control means for the respective work means, said actuating means operating said control means through said cycle.

3. The programmer of claim 2 wherein said control means includes a rotary control means adapted at predetermined intervals of rotation to operate one of said work means, and indexing means actuated by said actuating means to index said rotary control means through said intervals of rotation.

4. The programmer of claim 1 wherein said actuating means comprises a magnetically latched solenoid activated and deactivated by electrical impulses of opposite polarity.

5. The programmer of claim 3 including means indexing with said rotary control means to transmit the signal from said signal means to said actuating means when said rotary control means is in proper rotational position.

6. The programmer of claim 5 including interlocking means permitting said signal to be transmitted only when said indexing means is in proper position.

References Cited
UNITED STATES PATENTS

| | | | |
|---|---|---|---|
| 3,422,846 | 1/1969 | Link et al. | 137—624.18 |
| 1,985,589 | 12/1934 | Meer | 137—624.18 XR |
| 1,799,113 | 3/1931 | Miedbrodt | 137—624.18 XR |
| 2,247,059 | 6/1941 | Johnson | 317—137 XR |
| 2,762,952 | 9/1956 | Bruderlin | 317—157 XR |
| 2,882,056 | 4/1959 | Hooker | 317—137 XR |
| 3,162,777 | 12/1964 | Weber et al. | 307—141.4 |

WILLIAM M. SHOOP, Jr., Primary Examiner

U.S. Cl. X.R.

137—624.18; 307—141.4